June 24, 1930.  R. C. LEMONS ET AL  1,768,206
WEATHER SHIELD FOR FREIGHT CARS
Filed June 11, 1928  2 Sheets-Sheet 2
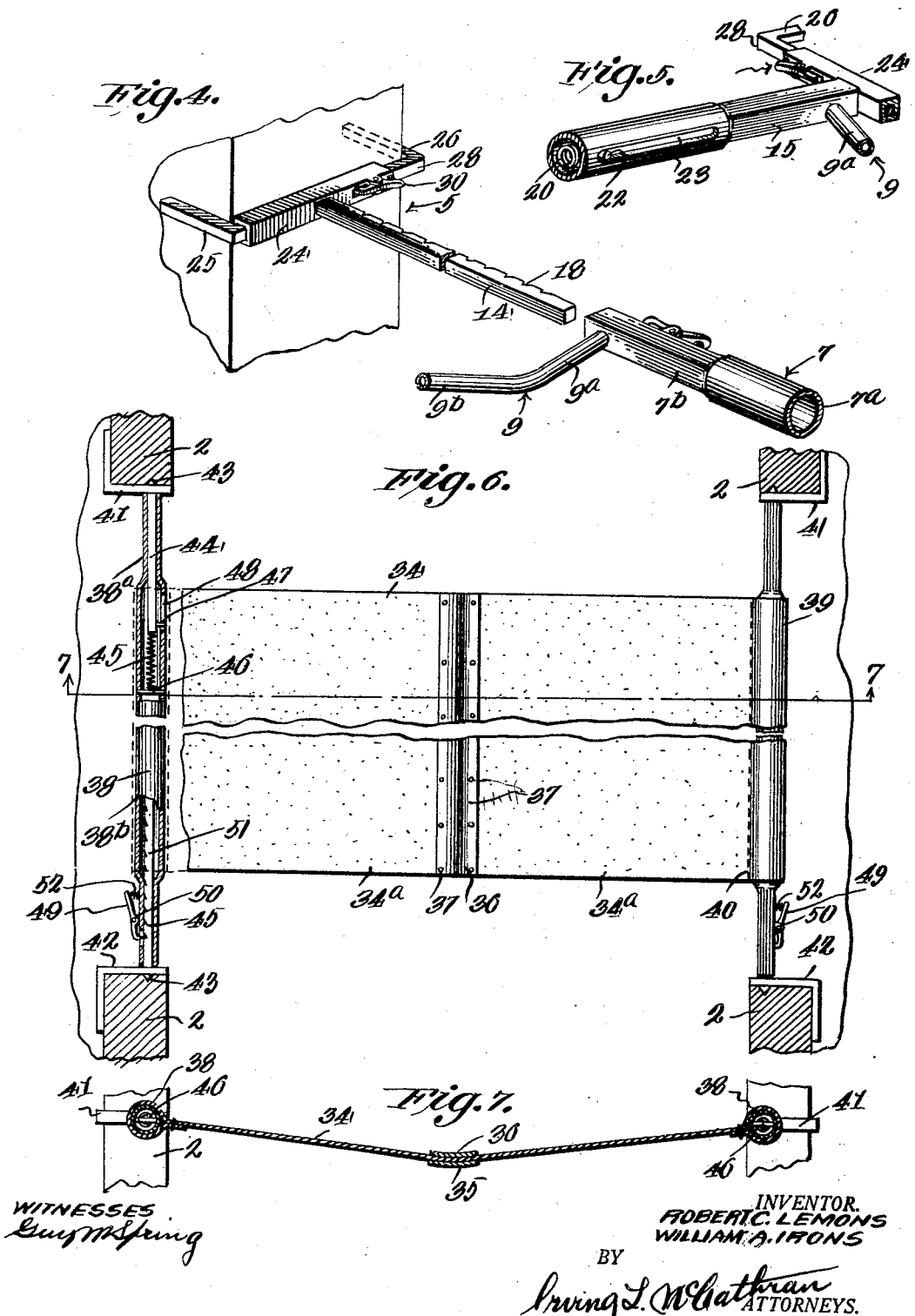
WITNESSES
INVENTOR.
ROBERT C. LEMONS
WILLIAM A. IRONS
BY
ATTORNEYS.

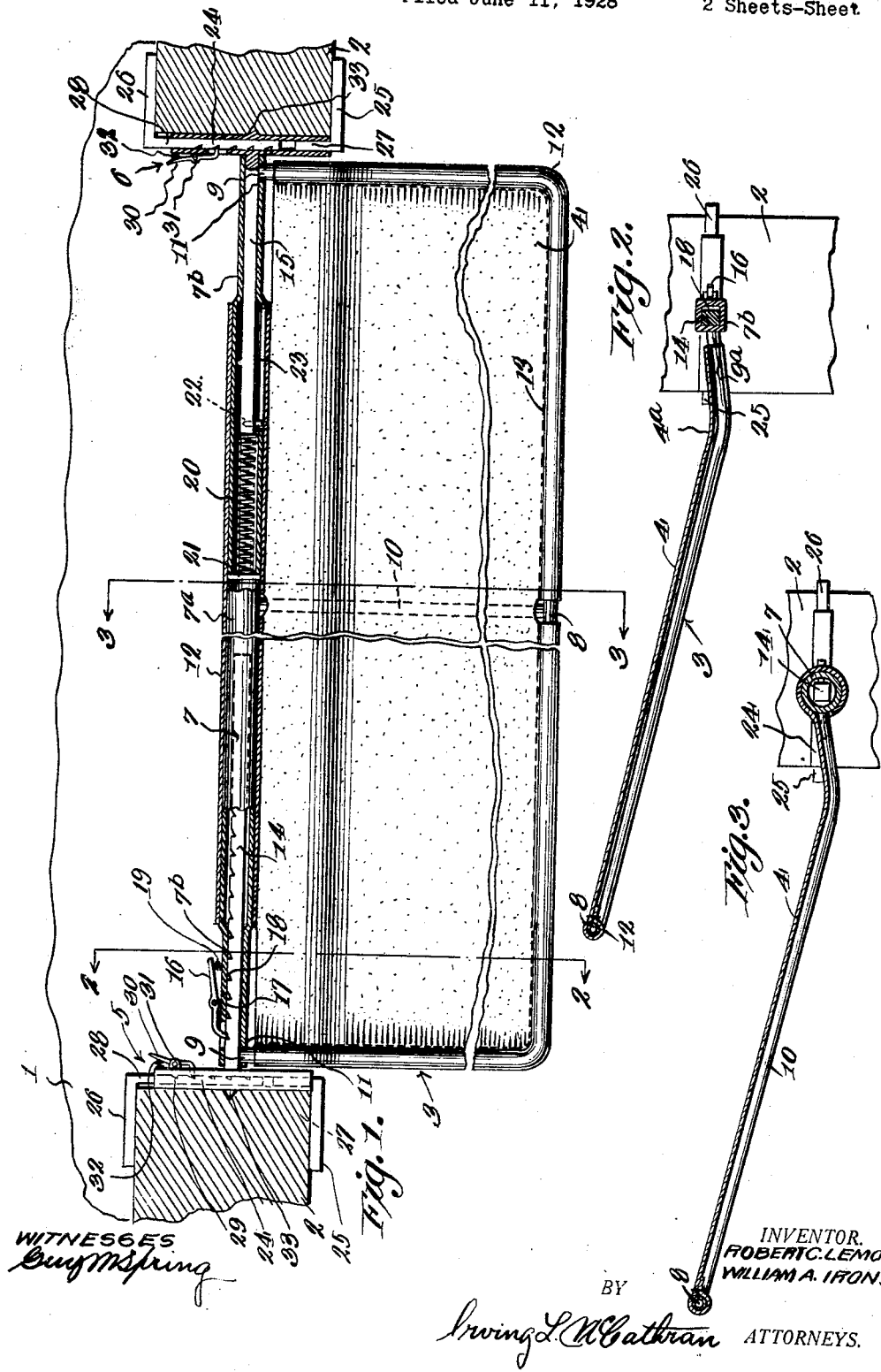

Patented June 24, 1930

1,768,206

UNITED STATES PATENT OFFICE

ROBERT C. LEMONS AND WILLIAM A. IRONS, OF CLIFTON FORGE, VIRGINIA

WEATHER SHIELD FOR FREIGHT CARS

Application filed June 11, 1928. Serial No. 284,550.

This invention relates to canopies, and has for one of its objects to provide a novel, simple and inexpensive device of this character which shall be especially adapted to be used between a car door and a freight house platform for the purpose of protecting freight handlers from the weather while engaged in loading or unloading the car.

The invention has for a further object to provide a canopy of the character stated which shall be equipped with means through the medium of which it may be easily and quickly secured to or removed from the stiles of the car door frame.

The invention has for a further object to provide a canopy of the character stated wherein the securing means shall be adapted to permit the application of the canopy to cars having doors of different widths and door stiles of different thicknesses.

The invention has for a further object to provide a canopy of the character stated which shall be so constructed as to permit the water to drain therefrom at a point between the car and the freight house platform.

The invention has for a further object to provide a canopy of the character stated which shall be adapted to be used between cars on adjacent parallel tracks for the purpose of protecting freight handlers from the weather while transferring freight from one car to the other, which shall be adapted to be easily and quickly connected to the stiles of the car door frames, which shall be adapted to be applied to the car door frames of different widths and thicknesses, and which shall embody a construction adapted to cause the water to drain therefrom at a point between the cars.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a view partly in horizontal section and partly in top plan illustrating the application of the canopy, Figure 2 is a sectional view taken on the vertical plane indicated by the line 2—2 of Figure 1, Figure 3 is a sectional view taken on the vertical plane indicated by the line 3—3 of Figure 1, Figure 4 is a perspective view illustrating in detail the parts of one of the clamps for securing the canopy in place, Figure 5 is a perspective view of the other clamp of the canopy, Figure 6 is a view partly in horizontal section and partly in top plan illustrating the application of the slightly modified form of the canopy, and Figure 7 is a sectional view taken on the vertical plane indicated by the line 7—7 of Figure 6.

Referring in detail to the drawings, in the several views of which corresponding parts are designated by like reference characters, 1 designates the floor of a freight car, and 2 the stiles of the door frame of the car.

The canopy comprises a frame 3 which is of oblong rectangular formation in plan, a cover 4 which is made from water proof fabric and attached to the frame, and clamps 5 and 6 which are connected to the frame and engaged with the stiles 2.

The frame 3 consists of an inner side bar 7, an outer side bar 8, end bars 9, and a central cross bar 10. The bars 8 and 9 are formed integrally, the bars 9 have their inner ends positioned and welded in openings 11 formed in the outer side of the bar 7, and the bar 10 has its ends positioned and welded in openings formed in the outer side of the bar 7 and the inner side of the bar 8. The bar 7 is hollow and has a central portion 7$^a$ of cylindrical formation and end portions 7$^b$ of angular formation in cross section.

The cover 4 is secured to the frame 3 by having its edge portions folded about the bars 7, 8 and 9, as shown at 12, the edge portions being stitched, as shown in 13, to the body portion of the cover. The canopy is secured to and between the stiles 2 with the greater portion thereof extending outwardly beyond the side of the car and overhanging the freight house platform. The bars 9 are of angular formation in elevation, and present inner short portions 9ª and outer long portions 9ᵇ. The arm portions 9ª incline downwardly and outwardly, and the arm portions 9ᵇ incline upwardly and outwardly, in order to provide the cover 4 with a depressed portion or trough 4ª. This portion or trough is arranged in close proximity to the car, and serves to drain the water from the cover at a point between the car and the freight house platform.

Clamps 5 and 6 are connected to the ends of the bar 7, and are of U-form to embrace the stiles 2 with their parts in contact with the inner, outer and opposing sides of the stiles. The clamps 5 and 6 are connected to the bar 7 by rods 14 and 15, respectively. The rods 14 and 15 are slidably arranged within the bar 7 to connect the clamps 5 and 6 to the bar for endwise adjustment with respect thereto, and thus adapt the canopy for application to cars having door frames of different widths. The clamp 5 is held in engagement with one of the stiles 2 by a pawl 16 which is pivoted, as at 17, to the bar 7, and engages in one of the series of notches 18 in the rod 14, and is held in active position by a spring 19. The jaw 6 is held in engagement with the other stile 2 by a coil spring 20 which is arranged within the bar 7 between the inner end of the rod 15 and an abutment 21 secured within the bar. The movement of the jaw 6 under the influence of the spring 20 is limited by a pin 22 carried by the bar 15 and working in a slot 23 formed in and extending longitudinally fo the bar 7. The rods 14 and 15 are of angular formation in cross section and have a snug fit in the portions 17 of the bar 7 so as to prevent the rods and bar from having any rotative or angular movements relatively.

The clamps 5 and 6 are similar, and each comprises a body portion 24 of hollow formation and angular in cross section, a relatively fixed jaw 25 arranged at one end of the body and a relatively movable jaw 26 arranged at the other end of the body. The bodies 25 are welded or otherwise secured to the rods 14 and 15. The jaws 25 are provided with shanks 27 which are arranged within and welded or otherwise secured to the bodies 24. The jaws 26 are provided with shanks 28 which are slidably arranged within the body portions 24 and provided with spaced notches 29. The shanks 27 and 28 are of angular formation in cross section and have a snug fit in the bodies 24 in order to prevent the bodies and jaws from having any relative angular movement.

The jaws 26 may be adjusted toward and away from the jaws 25, and they are held in their inwardly adjusted position by pawls 30 which are pivoted, as at 31, to the bodies 24 and engage in certain of the notches 29, the pawls being held in active position by springs 32. The bodies 24 are provided with prongs 33 which engage the stiles 2 and hold the canopy against vertical movement with respect thereto.

As the clamps 5 and 6 are secured to the bar 7 for adjustment relatively, and as the jaws 25 and 26 of each of the clamps are relatively adjustable, it should be apparent that the canopy may be readily positioned between and secured to the stiles of the car. The application of the canopy is also made easy by the resilient connection of the clamp 6 to the bar 7. As the clamps 5 and 6 are held against angular movement with respect to the canopy, as the jaws 25 and 26 are held against angular movement with respect to the bodies 24, and as the prongs 33 carried by the clamps engage the stiles 2, the canopy is held against any movement with respect to the stiles. The canopy projects beyond the side of the car and overlies the freight house platform, and due thereto will afford ample protection against the weather to freight handlers engaged in loading or unloading the car.

The canopy shown in Figures 6 and 7 is adapted to be arranged between cars on parallel adjacent tracks, and consists of a strip of water-proof fabric 34 which extends from the door opening of one car to the door opening of the other. The strip 34 is made in sections, and the sections 34ª thereof have certain of their ends arranged in overlapped relation and secured together by a lower strip 35 and an upper strip 36 which are of arcuate formation in cross section and secured in place by rivets 37. The terminals of the strip 34 are bent about bars 38, as shown at 39, and are stitched, as shown at 40, to the body portion of the strip. The bars 38 are positioned between the stiles 2 of the cars, and are secured in place by clamps 41 and 42. These clamps are of angular formation in plan and contact with the opposing and inner sides of the stiles 2. The clamps 41 and 42 are arranged at the ends of the bars 38, and are provided with prongs 43 which engage the opposing sides of the stiles 2, the clamps holding the bars against turning, and the prongs holding them against vertical movements with respect to the stiles. The clamps 41 and 42 are connected to the rods 38 for endwise adjustment with respect thereto, and this connection is established through the medium of rods 44 and 45 to which the clamps are fixedly connected and which are slidably arranged in reduced portions 38ª of the bars. The bar portions 38ª and rods 44 and 45 are angular in cross section to prevent these parts from having any relative angular movement. The clamps 41 are held in engagement with certain of the stiles 2 by springs 45 which are arranged in the cylindrical intermediate portions 38$^b$ of the bars 38 and between the inner ends of the rods 44 and abutments 46 fixed within the bars. The movement of the clamps 41 under the influence of the springs 45 is limited by pins 47 carried by the rods 44 and working in slots 48 in the rods 38. The jaws 42 are positively held in engagement with the other stiles 2 by pawls 49 pivoted, as at 50, to the bars 38 and engaging in certain of the notches 51 in the rods 45, the pawls being held in active position by springs 52. The bars 38, and the means for connecting the jaws 41 and 42 thereto, are similar to the corresponding parts of the canopy shown in Figures 1 to 5, and the clamps 41 and 42 differ but slightly from the clamps 5 and 6, the only difference being that the former are not provided with adjustable jaws. The strip 34 of this canopy extends across the space between the cars and affords ample protection to those engaged in loading or unloading the cars or transferring freight from one to the other. The strip 34 inclines downwardly in the direction of its transverse center to provide a trough in the strip which will readily conduct the water from the strip.

While we have described the principle of the invention, together with the devices which we now consider to be the best embodiments thereof, we desire to have it understood that the devices shown are merely illustrative, and that such changes may be made when desired as are within the scope of the invention as claimed.

What we claim is:

1. A canopy comprising a frame, a cover therefor, clamps, means yieldably connecting one of the clamps to the frame, means adjustably connecting the other clamp to the frame, and means for securing the other clamp in adjusted position.

2. A canopy comprising a frame, a cover therefor, rods slidably associated with the frame, clamps carried by the rods, a spring bearing against one of the rods, and securing means carried by the frame and engaging the other rod.

In testimony whereof we affix our signatures.

ROBERT C. LEMONS.
WILLIAM A. IRONS.